(12) United States Patent
Rothe

(10) Patent No.: US 10,903,662 B2
(45) Date of Patent: Jan. 26, 2021

(54) RECHARGEABLE BATTERY ARRANGEMENT WITH IMPROVED SYMMETRIZATION

(71) Applicant: Bayerische Motoren Werke Aktiengesellschaft, Munich (DE)

(72) Inventor: Steffen Rothe, Dresden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 130 days.

(21) Appl. No.: 16/166,233

(22) Filed: Oct. 22, 2018

(65) Prior Publication Data

US 2019/0058335 A1 Feb. 21, 2019

Related U.S. Application Data

(63) Continuation of application No. PCT/EP2017/059454, filed on Apr. 21, 2017.

(30) Foreign Application Priority Data

May 2, 2016 (DE) .................. 10 2016 207 555

(51) Int. Cl.
  *H02J 7/00* (2006.01)

(52) U.S. Cl.
  CPC .......... *H02J 7/0014* (2013.01); *H02J 7/0016* (2013.01); *Y02T 10/70* (2013.01)

(58) Field of Classification Search
  CPC .... H02J 7/0014; H02J 7/0016; Y02T 10/7055
  See application file for complete search history.

(56) References Cited

U.S. PATENT DOCUMENTS 5,747,964 A * 5/1998 Turnbull ............... H02J 7/0016
  320/124
5,805,068 A * 9/1998 Bradus .................. H02J 7/0021
  324/433

(Continued)

FOREIGN PATENT DOCUMENTS

DE 10 2009 045 519 A1 4/2011
DE 10 2011 079 253 A1 1/2013
(Continued)

OTHER PUBLICATIONS

Horowitz P. et al., "Feedback and Operational Amplifiers", The Art of Electronics, 1989, pp. 175-179, The Press Syndicate of the University of Cambridge, Cambridge, UK, XP002771245, (seven (7) pages).

(Continued)

*Primary Examiner* — Richard Isla
*Assistant Examiner* — Johali A Torres Ruiz
(74) *Attorney, Agent, or Firm* — Crowell & Moring LLP

(57) ABSTRACT

A rechargeable battery arrangement includes a plurality of rechargeable battery cells which are connected in series and each have a first and a second connection, and a plurality of differential amplifiers each having an inverting input, a non-inverting input and an output at which an amplified difference between the signal at the inverting input and the signal at the non-inverting input is produced. The non-inverting input of one of the plurality of differential amplifiers is coupled to the second connection of a first rechargeable battery cell unit of the plurality of rechargeable battery cells and to the first connection of a second rechargeable battery cell unit of the plurality of rechargeable battery cells. The inverting input of the one of the plurality of differential amplifiers is connected to the first connection of the first rechargeable battery cell unit of the plurality of rechargeable battery cells via a first resistor and to the second connection of the rechargeable battery cell unit of the plurality of rechargeable battery cells via a second resistor. The output of the differential amplifier is connected to the second connection of the second rechargeable battery cell unit.

11 Claims, 4 Drawing Sheets

(56) References Cited

U.S. PATENT DOCUMENTS

| | | | |
|---|---|---|---|
| 7,126,310 B1* | 10/2006 | Barron | H02J 7/0016 320/108 |
| 10,056,765 B2 | 8/2018 | Schuster et al. | |
| 2005/0269989 A1* | 12/2005 | Geren | H02J 7/0016 320/119 |
| 2014/0035360 A1* | 2/2014 | Butzmann | H02J 7/0063 307/10.1 |
| 2017/0166078 A1* | 6/2017 | Elie | B60L 11/1866 |

FOREIGN PATENT DOCUMENTS

| | | |
|---|---|---|
| DE | 10 2012 201 359 A1 | 8/2013 |
| DE | 10 2013 021 535 A1 | 6/2015 |
| JP | 2010-63264 A | 3/2010 |

OTHER PUBLICATIONS

International Search Report (PCT/ISA/210) issued in PCT Application No. PCT/EP2017/059454 dated Jul. 3, 2017 with English translation (seven pages).

German-language Written Opinion (PCT/ISA/237) issued in PCT Application No. PCT/EP2017/059454 dated Jul. 3, 2017 (seven pages).

German-language Search Report issued in German Application No. 10 2016 207 555.1 dated Feb. 17, 2017 with partial English translation (11 pages).

\* cited by examiner

RECHARGEABLE BATTERY ARRANGEMENT WITH IMPROVED SYMMETRIZATION

CROSS REFERENCE TO RELATED APPLICATIONS

This application is a continuation of PCT International Application No. PCT/EP2017/059454, filed Apr. 21, 2017, which claims priority under 35 U.S.C. § 119 from German Patent Application No. 10 2016 207 555.1, filed May 2, 2016, the entire disclosures of which are herein expressly incorporated by reference.

BACKGROUND AND SUMMARY OF THE INVENTION

The present invention relates to a battery arrangement with improved voltage symmetrization in series-connected to battery cells.

The capacity of a battery arrangement having a plurality of series-connected cells is essentially dictated by the behavior of the poorest cell. By means of symmetrization, the state of charge of the individual cells in a string comprised of a plurality of series-connected battery cells can be balanced. The practically available capacity of the battery arrangement can be increased accordingly.

DE 10 2013 021 535 A1 discloses an inductive balancing circuit.

In an electric drive system according to the prior art, the symmetrization of electrically series-connected battery cells for a motor vehicle is achieved by means of parallel-connected control circuits. By this arrangement, each battery cell and/or each battery module can be separately monitored and symmetrized. DC/DC converters are customarily employed as control circuits. Circuits of this type are complex, and generate losses which reduces the practically available capacity.

The object of the invention is to provide a battery arrangement with improved symmetrization.

The object of the invention is fulfilled by a battery arrangement as well as having such a battery arrangement by an electric drive system for a motor vehicle in accordance with embodiment of the invention.

A battery arrangement according to the invention comprises a plurality of series-connected battery cells, each having a first and a second connection, and a plurality of differential amplifiers, each having an inverting input, a non-inverting input and an output at which a difference between the signal at the inverting input and the signal at the non-inverting input is present. The non-inverting input of one of the plurality of differential amplifiers is coupled to the second connection of a first battery cell unit of the plurality of battery cells, and to the first connection of a second battery cell unit of the plurality of battery cells. The inverting input of the one of the plurality of differential amplifiers is connected to the first connection of the first battery cell unit of the plurality of battery cells by way of a first resistor, and to the second connection of the second battery cell unit of the plurality of battery cells by way of a second resistor. The output of the differential amplifier is connected to the second connection of the second battery cell unit.

According to the invention, the balancing of the battery cells to be symmetrized in the series circuit is achieved by the respectively adjoining battery cells, or another battery cell, being employed as a reference voltage source. This permits the battery cells and the balancing circuit, which comprises the above-described differential amplifiers, to be configured in a cascade arrangement, as required.

The differential amplifier can be an operational amplifier. The design and operating method of a differential amplifier or an operational amplifier is known to a person skilled in the art.

The first battery cell unit can comprise a single battery cell.

The second battery cell unit can comprise a plurality of series-connected battery cells. In this case, the first battery cell or battery cell unit functions as a reference cell, in order to permit the adjustment or symmetrization of the voltage of the second battery cell unit.

In another embodiment, the second battery cell unit can comprise a single battery cell. If the first battery cell unit comprises a single battery cell and the second battery cell unit comprises a single battery cell, each individual battery cell is symmetrized with the respectively adjoining battery cell. The entire series circuit of battery cells can be symmetrized accordingly. In this case, the first resistor and the second resistor have an identical rating.

In another embodiment, the first battery cell unit and the second battery cell unit can comprise an identical number of series-connected battery cells. In this form of embodiment, the first resistor and the second resistor have an identical rating.

In one further embodiment, the first battery cell unit can comprise a number n of series-connected battery cells. The second battery cell unit can comprise a number m of series-connected battery cells. The quotient of the rating of the first resistor to the rating of the second resistor is n/m.

The first connection of a battery cell can be the connection at the negative potential, and the second connection of a battery cell can be the connection at the positive potential. In this form of embodiment, the differential amplifier, as a result of its circuit connection, has an amplification factor of 2.

In another embodiment, the first connection of a battery cell can be the connection at the positive potential, and the second connection of a battery cell can be the connection at the negative potential. In this form of embodiment, the differential amplifier, as a result of its circuit connection, has an amplification factor of −1.

In another embodiment, the battery arrangement can comprise a third differential amplifier and a third battery cell unit, which is connected in series with the second battery cell unit. The non-inverting connection of the third differential amplifier can be connected to the second connection of the second battery cell unit. The inverting connection of the third differential amplifier can be connected, via a third resistor, to the first connection of the second battery cell unit and, via a fourth resistor, to the second connection of the third battery cell unit. The output of the third differential amplifier can be connected to the second connection of the third battery cell unit. As a result, a cascade arrangement of balancing circuits is constituted, thus ensuring that the entire string of a plurality of series-connected battery cells is symmetrized.

In one further embodiment, the battery arrangement can incorporate a fourth differential amplifier and a fourth battery cell unit, which is connected in series with the second battery cell unit. The non-inverting connection of the fourth differential amplifier can be connected to the second connection of the first battery cell unit. The inverting connection of the fourth differential amplifier can be connected, via a fifth resistor, to the first connection of the first battery cell unit, and via a sixth resistor to the second connection of the fourth battery cell unit. The output of the fourth differential amplifier can be connected to the second connection of the fourth battery cell unit.

The invention further relates to an electric drive system having an electrical machine and a converter, wherein the converter is connected to the above-described battery arrangement. The drive system can be a drive system for a vehicle. The principles of an electric drive system are known to a person skilled in the art, and do not need to be described in any greater detail here.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
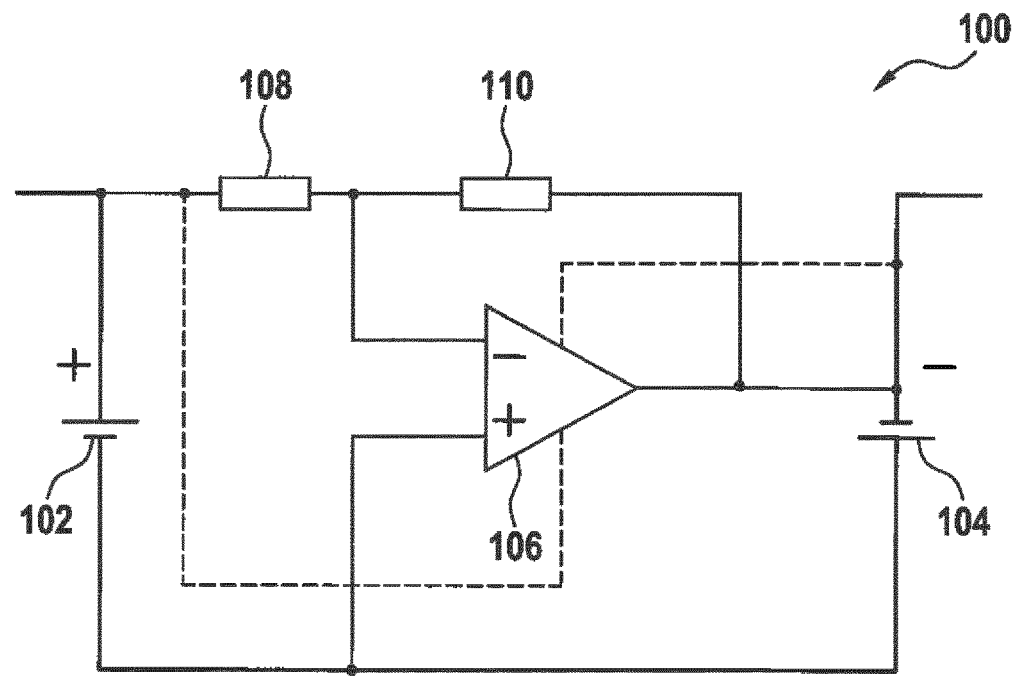
FIG. 1 is a circuit diagram of a first form of embodiment of the invention.

FIG. 1 shows a first form of embodiment of the invention. A first battery cell 102 and a second battery cell 104 are connected in series. An output of an operational amplifier 106 is connected to the negative pole of the second battery cell 102. A non-inverting input of the operational amplifier 106 is connected to the negative pole of the first battery cell 102. An inverting input of the operational amplifier 106 is connected via a first resistor 108 to a positive pole of the first battery cell 102. The inverting input of the operational amplifier 106 is coupled via a second resistor 110 to the output of the operational amplifier 106 or to the negative pole of the second battery cell 104. The first battery cell 202 constitutes a first battery cell unit, and the second battery cell 204 constitutes a second battery cell unit.

In this form of embodiment, the operational amplifier 106, as a result of its circuit connection, has an amplification factor of −1. In this form of embodiment, the rating of the first resistor 108 and the rating of the second resistor 110 are identical.

By means of the operational amplifier 106 and the circuit connection thereof, it is achieved that the same potential is present on the connections of the first battery arrangement 102 and the second battery arrangement 104. In consequence, the first battery cell 102 and the second battery cell 104 are mutually symmetrized. As mentioned at the beginning, by means of symmetrization it is achieved that a higher proportion of the charge in the battery cells 102, 104 is available for electrical loads which are connected thereto.

Figure 2:
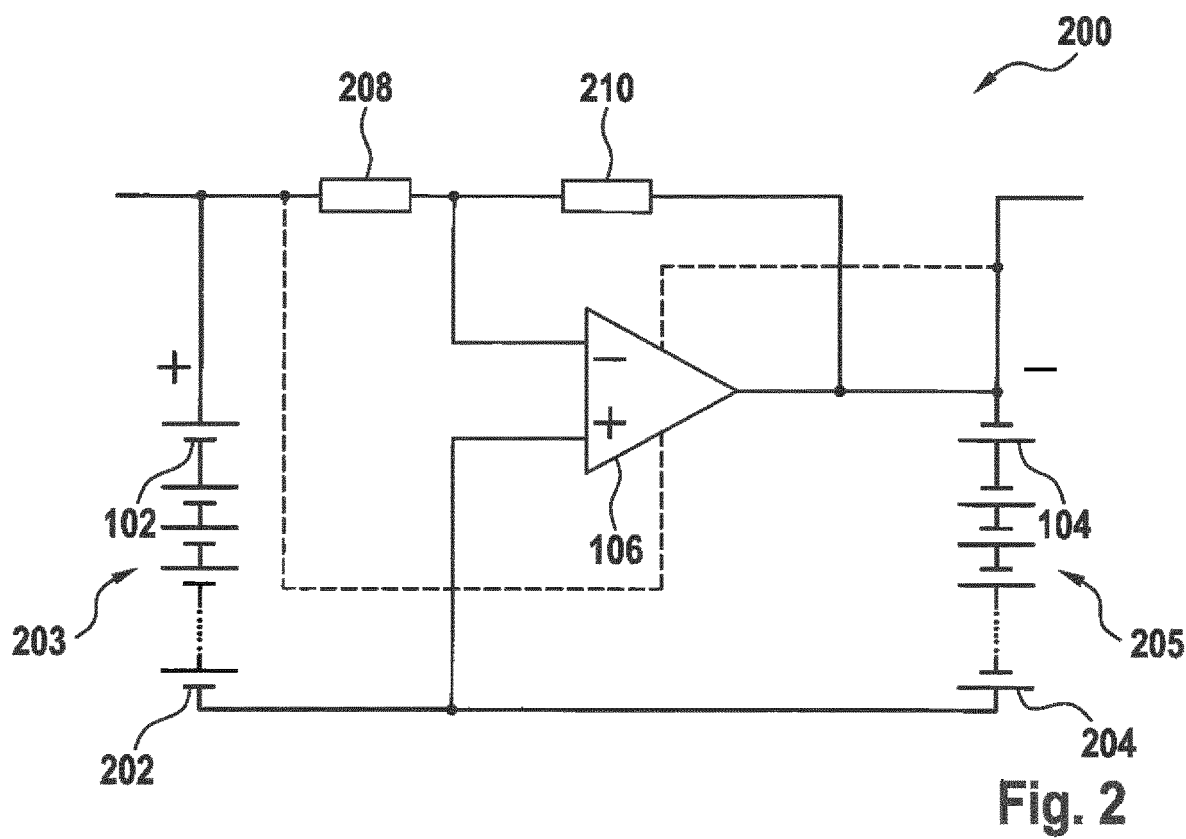
FIG. 2 is a circuit diagram of a second form of embodiment of the invention.

FIG. 2 shows a second form of embodiment of the invention. A first group 203 of battery cells 102, 202 is connected in series with a second group 205 of battery cells 104, 204. In each group 203, 205 of battery cells, a plurality of battery cells are connected in series. The first group 203 constitutes a first battery cell unit, and the second group 205 constitutes a second battery cell unit.

An output of the operational amplifier 106 is connected to the negative pole of the second battery cell 104, which forms part of the second group 205. A non-inverting input of the operational amplifier 106 is connected to the negative pole of a third battery cell 202, which forms part of the first group 203 of battery cells. The inverting input of the operational amplifier 106 is coupled via a first resistor 208 to the positive pole of the first battery cell 102. Moreover, the inverting input of the operational amplifier 106 is coupled via a second resistor 210 to the output of the operational amplifier 106 and to the negative pole of the second battery cell 104, which forms part of the second group 205.

The first group 203 of series-connected battery cells 102, 202 can comprise a number n of series-connected battery cells 102, 202, wherein the first battery cell 102 is the first battery cell in the series circuit, and the third battery cell 202 is the last battery cell in the series circuit (first group) 203. n is a natural number (excluding zero). The second group 205 of series-connected battery cells 104, 204 can comprise a number m of series-connected battery cells 104, 204, wherein the second battery cell 104 is the first battery cell in the series circuit, and a fourth battery cell 204 is the last battery cell in the series circuit (second group) 205. m is a natural number (excluding zero). The quotient of the first resistor 208 to the second resistor 210 is n/m. Consequently, as a result of its circuit connection, the operational amplifier 106 functions as a voltage amplifier or voltage converter. The operational amplifier 106 mutually balances the voltage of the first series circuit 203 comprising battery cells 102, 202 with the voltage of the second series circuit 205 of the battery cells 104, 204.

If both groups 203, 205 are at the same voltage, the first resistor 208 and the second resistor 210 will be of the same rating. In all other cases, the quotient of the first resistor 208 to the second resistor 210 will be selected in accordance with the voltage ratio of the voltages of the groups 203, 205, for example on the basis of the number of battery cells. A group can be, for example, a module of battery cells.

Figure 3:
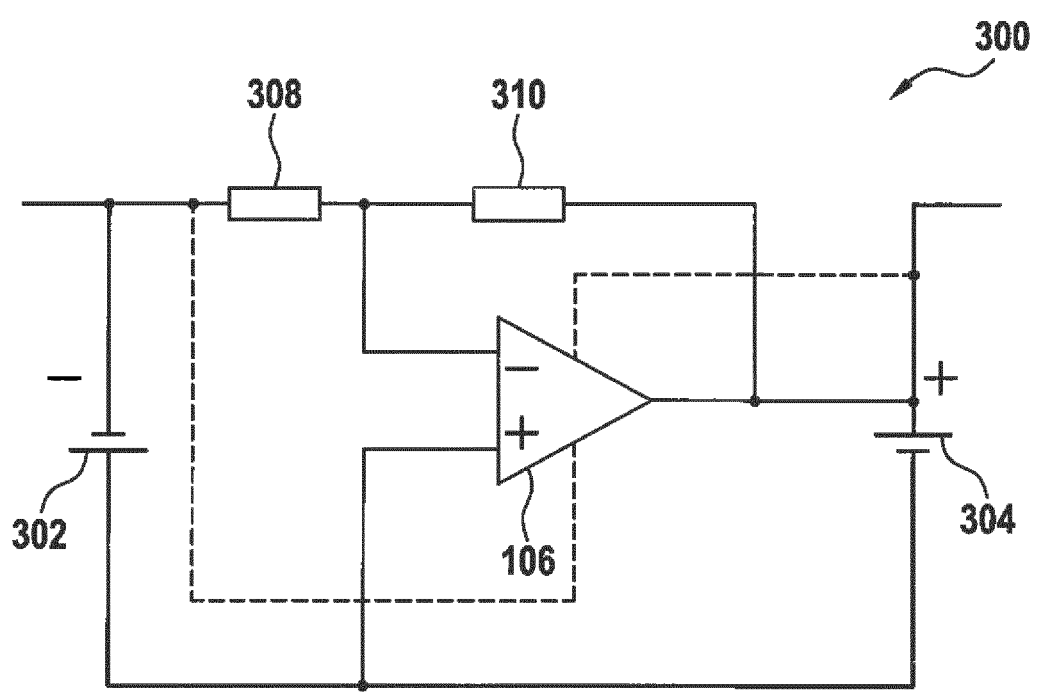
FIG. 3 is a circuit diagram a third form of embodiment of the invention.

Reference will now be made to FIG. 3, which represents a third form of embodiment of the invention. This form of embodiment is essentially complementary to the first form of embodiment. A first battery cell 302 and a second battery cell 304 are connected in series. An output of an operational amplifier 106 is coupled to the positive pole of the second battery cell 304. A non-inverting input of the operational amplifier 106 is connected to the positive pole of the first battery cell 202. An inverting input of the operational amplifier 106 is coupled via a first resistor 308 to the negative pole of the first battery cell 302. The negative pole of the operational amplifier 106 is connected via a second resistor 310 to the output of the operational amplifier 106 and to the positive pole of the battery cell 304.

In the third form of embodiment, the operational amplifier 106, as a result of its circuit connection, functions as a voltage amplifier with an amplification factor of 2.

It is understood that, in this form of embodiment, the first battery cell 302 and/or the second battery cell can also be replaced by a series-connected arrangement of a plurality of battery cells, as described with reference to the form of embodiment represented in FIG. 2.

Moreover, a string of series-connected battery cells and/or battery cell groups or battery cell units can be fully symmetrized if all the battery cells in the string are connected as described in greater detail with reference to FIGS. 4 and 5, which represent variations of the preceding form of embodiment and wherein, in the interests of conciseness, only the differences in relation to the preceding forms of embodiment are described.

Figure 4:
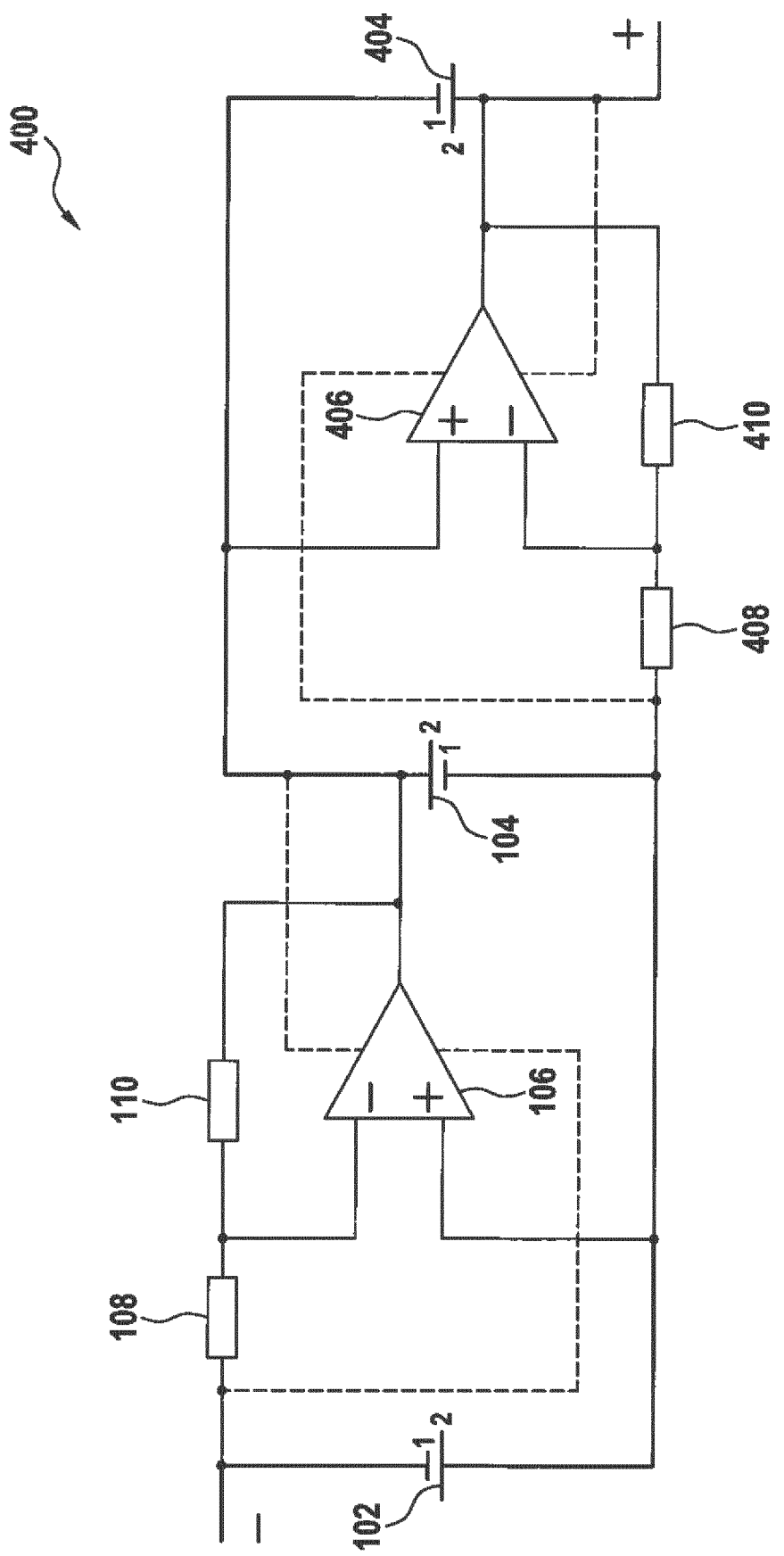
FIG. 4 is a circuit diagram of an interconnected cascade arrangement of balancing circuits.

FIG. 4 shows a form of embodiment of the battery arrangement 400 with a third differential amplifier 406 and a third battery cell 404, which is connected in series with the second battery cell 104. The non-inverting connection of the third differential amplifier 406 is connected to the second connection of the second battery cell 104. The inverting connection of the third differential amplifier 406 is connected via a third resistor 408 to the first connection of the second battery cell 104, and via a fourth resistor 410 to the second connection of the third battery cell 404. The output of the third differential amplifier 406 is connected to the second connection of the third battery cell 404. In this form of embodiment, symmetrization of the voltage of the battery cells is achieved by means of a cascade arrangement. It is understood that, in this form of embodiment, each battery cell can be replaced by a battery cell unit comprising a plurality of battery cells, and the ratings of the resistors can be adjusted in accordance with the voltage of the battery cell units.

Figure 5:
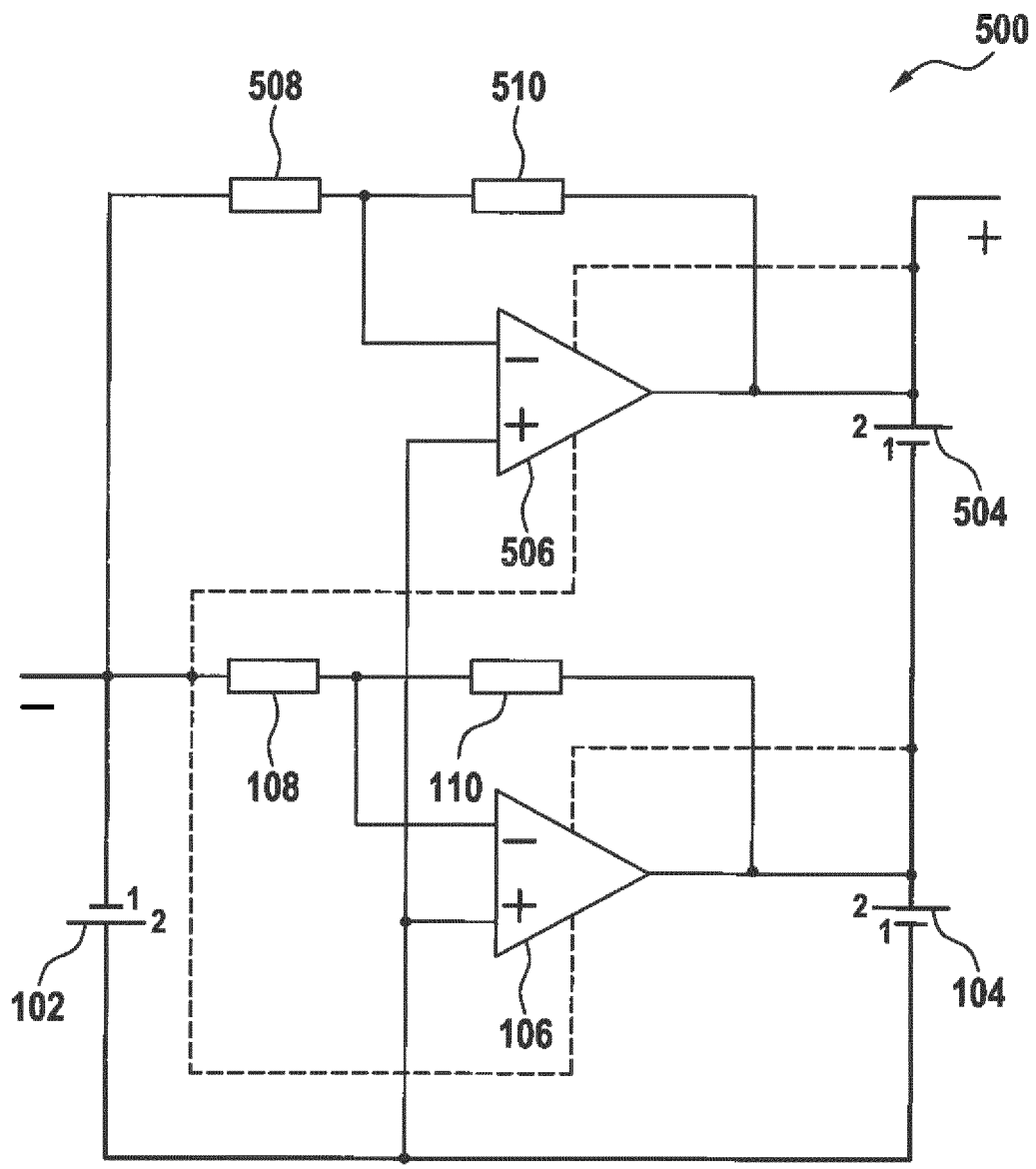
FIG. 5 is a circuit diagram of part of a symmetrized string, in which one battery cell functions as a reference cell.

FIG. 5 shows a further form of embodiment of a battery arrangement 500, with a fourth differential amplifier 506 and a fourth battery cell unit 504, which is connected in series with the second battery cell 104. The non-inverting connection of the fourth differential amplifier 506 is connected to the second connection of the first battery cell unit 102. The inverting connection of the fourth differential amplifier 506 is connected via a fifth resistor 508 to the first connection of the first battery cell unit 102, and via a sixth resistor 510 to the second connection of the fourth battery cell unit 504. The output of the fourth differential amplifier 506 is connected to the second connection of the fourth battery cell unit 504. In this form of embodiment, the first battery cell 102 functions as a reference cell, to the voltage of which the voltage of the other battery cells 105, 504 is symmetrized. It is understood that, in this form of embodiment, each battery cell can also be replaced by a battery cell unit comprising a plurality of battery cells, and the ratings of the resistors can be adjusted in accordance with the voltage of the battery cell units.

The forms of embodiment according to FIGS. 4 and 5 have been described such that the first connection of a battery cell is the negative pole, and the second connection is the positive pole. As shown in FIG. 1, the first connection of a battery cell can be the positive pole, and the second connection can be the negative pole.

In all the forms of embodiment, the differential amplifiers are represented such that the supply voltage thereof is infed via the broken lines. Differential amplifiers or operational amplifiers of this type may be "rail-to-rail operational amplifiers" which, even in the event of input signals which have the magnitude of the supply voltage, can function as operational amplifiers. It will be understood that any desired voltage other than the supply voltage can be employed for the operational amplifiers, provided that it is higher than the voltage on the inverting input and/or on the non-inverting input.

The present invention has the advantage that battery cells in a series-connected arrangement of a plurality of battery cells can be symmetrized using simple means, thereby increasing the practically available capacity of the battery arrangement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A battery arrangement, comprising:
    a plurality of series-connected battery cells, each having a first and a second connection;
    a plurality of differential amplifiers, each having an inverting input, a non-inverting input and an output at which an amplified difference between the signal at the inverting input and the signal at the non-inverting input is present;
    wherein the non-inverting input of a first differential amplifier of the plurality of differential amplifiers is coupled to the second connection of a first battery cell unit of the plurality of battery cells, and to the first connection of a second battery cell unit of the plurality of battery cells;
    wherein the inverting input of the first differential amplifier is connected to the first connection of the first battery cell unit of the plurality of battery cells via a first resistor and to the second connection of the second battery cell unit of the plurality of battery cells via a second resistor; and
    wherein the output of the first differential amplifier is connected to the second connection of the second battery cell unit;
    a fourth differential amplifier and a fourth battery cell unit, which is connected in series with the second battery cell unit, wherein
    the non-inverting connection of the fourth differential amplifier is connected to the second connection of the first battery cell unit, and
    the inverting connection of the fourth differential amplifier is connected, via a fifth resistor, to the first connection of the first battery cell unit and, via a sixth resistor, to the second connection of the fourth battery cell unit, and
    the output of the fourth differential amplifier is connected to the second connection of the fourth battery cell unit.

2. The battery arrangement as claimed in claim 1, wherein the first differential amplifier is an operational amplifier.

3. The battery arrangement as claimed in claim 1, wherein the first battery cell unit comprises a battery cell.

4. The battery arrangement as claimed in claim 1, wherein the second battery cell unit comprises a battery cell.

5. The battery arrangement as claimed in claim 1, wherein the first battery cell unit comprises a battery cell and the second battery cell unit comprises a battery cell, wherein the first resistor and the second resistor have an identical rating.

6. The battery arrangement as claimed claim 1, wherein the first battery cell unit and the second battery cell unit comprise an identical number of series-connected battery cells, wherein the first resistor and the second resistor have an identical rating.

7. The battery arrangement as claimed in claim 1, wherein the first battery cell unit comprises a number n of series-connected battery cells,
    the second battery cell unit comprises a number m of series-connected battery cells, and
    wherein the quotient of the rating of the first resistor to the rating of the second resistor is n/m.

8. The battery arrangement as claimed in claim 1, wherein the first connection of a battery cell is the connection at the negative potential, and the second connection of a battery cell is the connection at the positive potential.

9. The battery arrangement as claimed in claim 1, wherein the first connection of a battery cell is the connection at the positive potential, and
the second connection of a battery cell is the connection at the negative potential.

10. The battery arrangement as claimed in claim 1, further comprising:
a third differential amplifier and a third battery cell unit which is connected in series with the second battery cell unit, wherein
the non-inverting connection of the third differential amplifier is connected to the second connection of the second battery cell unit, and
the inverting connection of the third differential amplifier is connected, via a third resistor to the first connection of the second battery cell unit and, via a fourth resistor, to the second connection of the third battery cell unit, and
the output of the third differential amplifier is connected to the second connection of the third battery cell unit.

11. An electric drive system, comprising:
an electrical machine and a converter; and
a battery arrangement as claimed in claim 1,
wherein the converter is connected to the battery arrangement.

* * * * *